United States Patent
Akahori (10) Patent No.: US 7,046,743 B2
(45) Date of Patent: May 16, 2006

(54) DEMODULATOR FOR DEMODULATING DIGITAL MODULATED SIGNALS

(75) Inventor: Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 778 days.

(21) Appl. No.: 09/950,884

(22) Filed: Sep. 13, 2001

(65) Prior Publication Data

US 2002/0034266 A1 Mar. 21, 2002

(30) Foreign Application Priority Data

Sep. 19, 2000 (JP) .............................. 2000-288885

(51) Int. Cl.
*H03D 3/22* (2006.01)
*H04L 27/14* (2006.01)

(52) U.S. Cl. ...................... 375/331; 375/324; 375/325; 375/200

(58) Field of Classification Search ................ 375/331, 375/324, 330; 329/306
See application file for complete search history.

(56) References Cited

U.S. PATENT DOCUMENTS

| 5,097,220 A | * | 3/1992 | Shimakata et al. | ......... 329/306 |
| 5,412,694 A | * | 5/1995 | Sato et al. | .................. 375/330 |
| 5,757,862 A | * | 5/1998 | Ishizu | ........................ 375/324 |

* cited by examiner

*Primary Examiner*—Stephen Chin
*Assistant Examiner*—Jaison Joseph
(74) *Attorney, Agent, or Firm*—Volentine Francos & Whitt, PLLC

(57) ABSTRACT

A differential detector produces, for each symbol, a phase difference between received phase information and one-symbol-delayed phase information, and delivers the phase difference to a differential circuit and a phase corrector. Another differential detector produces, for each symbol, a phase difference between the one-symbol-delayed phase information and two-symbol-delayed phase information of the received phase information. The differential circuit produces, for each symbol, phase-difference difference information from a difference between both the phase differences. A phase error detector obtains a phase error caused by a difference in the carrier frequency between a sending and a receiving digital radio apparatus, based on the phase-difference difference information and either of both phase differences. A phase corrector subtracts the phase error from the phase difference.

16 Claims, 9 Drawing Sheets

DEMODULATOR FOR DEMODULATING DIGITAL MODULATED SIGNALS

BACKGROUND OF THE INVENTION

1. Field of the Invention

The present invention relates to a demodulator. More particularly, in a digital radio transmission system to which PSK (Phase Shift Keying) is applied between a sending digital radio apparatus and a receiving digital radio apparatus, the present invention relates to a demodulator applicable to a receiving digital radio apparatus suitable for correction of an error in phase information received by the receiving digital radio apparatus and for clock regeneration regardless of carrier frequency error amount (predetermined phase error amount) between a carrier received from the sending digital radio apparatus and a carrier generated in the receiving digital radio apparatus.

2. Description of the Background Art

Figure 5:
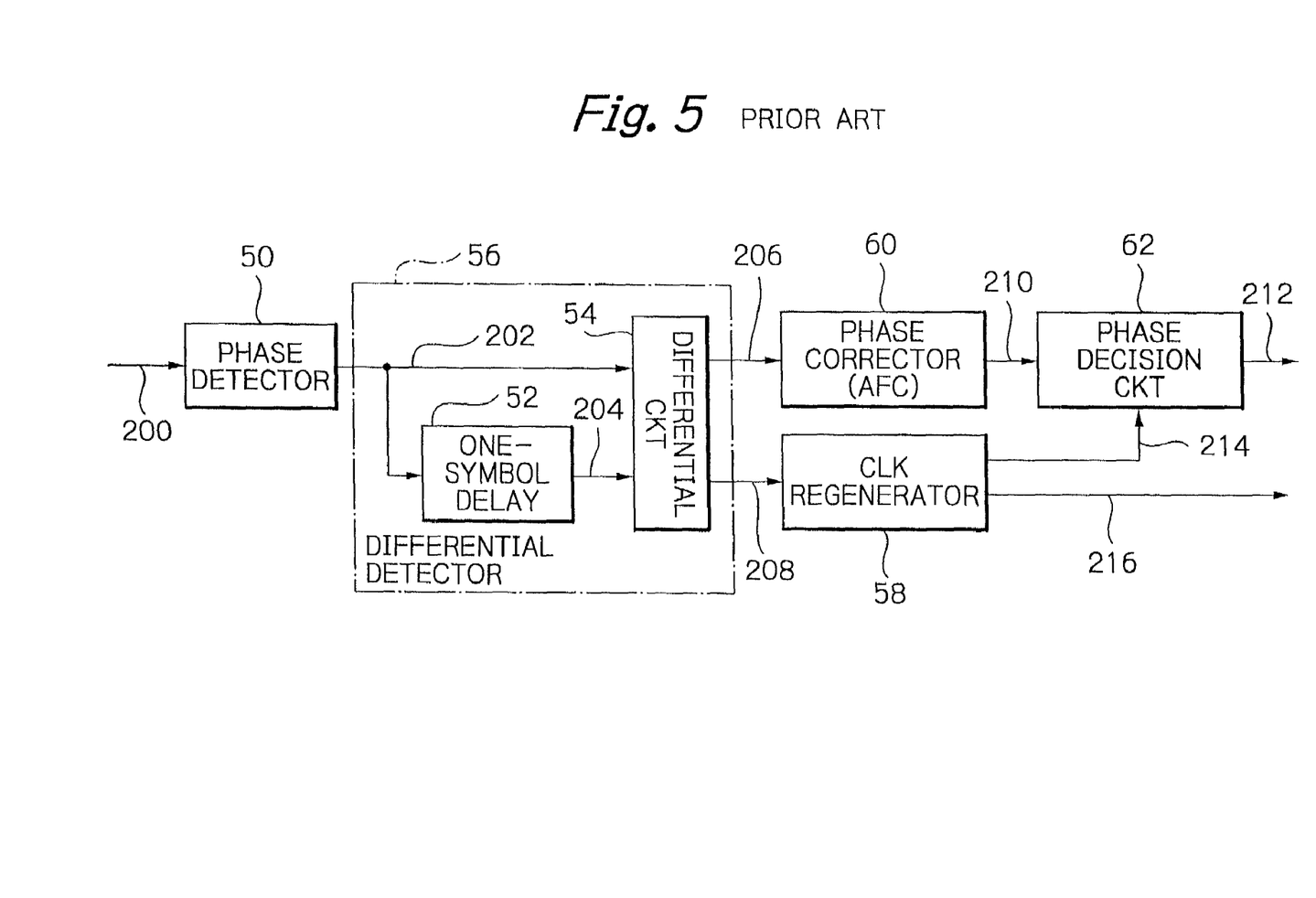
FIG. 5 is a functional block diagram schematically showing an example of a conventional demodulator which is applied to a receiving digital radio apparatus.

FIG. 5 shows an example of the functional block of a conventional demodulator used in a receiving digital radio apparatus in a digital radio transmission system to which π/4 shift QPSK (Quadrature Phase Shift Keying) is applied between a sending digital radio apparatus and a receiving digital radio apparatus.

The demodulator shown in FIG. 5 comprises a phase detector 50, a differential detector 56 composed of a one-symbol delay 52 and a differential circuit 54, a clock regenerator 58, a phase corrector (AFC) 60, and a phase decision circuit 62. As shown in FIG. 5, the clock regeneration system of the conventional digital demodulator comprises the phase detector 50, differential detector 56, and clock regenerator 58, and the signal regeneration system comprises the phase detector 50, differential detector 56, phase corrector (AFC) 60, and phase decision circuit 62.

More specifically, as shown in FIG. 5, the conventional demodulator uses the phase difference information (differential detection information) generated based on the difference in phase between the current symbol and the immediately-preceding symbol to regenerate or recover clocks. Based on these regenerated clock signals and on the phase difference information (differential detection information) about corrected absolute phase of the above-described phase difference information (differential detection information), the demodulator determines the phase of received signals to regenerate signals.

The operation of the demodulator shown in FIG. 5 will be described. The phase detector 50 receives, on its input 200, quadrature detection signals $R(t)=I_R(t)$, $Q_R(t)$ (where t is time), the base-band signals generated by quadrature-detecting the received signals. The received analog signals $I_R(t)$, $Q_R(t)$ are each input to the A/D converters, not shown in the figure, included in the phase detector 50. These A/D converters convert the signals to i and q digital signals.

The converted digital signals i, and q are input to the $\tan^{-1}(q/i)$ operation circuit, not shown in the figure, included in the phase detector 50. The digital signals are converted to $\tan^{-1}(q/i)$ and then to phase information A(t) by this $\tan^{-1}(q/i)$ operation circuit. In the A/D converters described above, the signals are A/D converted at the symbol rate synchronizing with the reception symbol timing signal.

The phase signal A(t) generated by the phase detector 50 is sent to one of the two inputs of the differential circuit 54 on a signal line 202 and to the input of the one-symbol delay 52. The one-symbol delay 52 delays the received phase signal A(t) for one symbol period to generate a one-symbol-delayed phase signal A(t−T), where T is a one-symbol period.

The phase signal A(t−T) generated by the one-symbol delay 52 is input to the other input of the differential circuit 54 over a signal line 204. The differential circuit 54 generates the phase difference between the one-symbol-delayed signal A(t−T) and the received phase signal A(t).

Specifically, from an output 206 and an output 208 of the differential circuit 54, the phase-difference information, that is, the phase deviation information $A_T(t)=A(t-T)-A(t)$ is output. This phase deviation information $A_T(t)$ is sent to the phase corrector 60 over the signal line 206. The phase corrector 60 changes the phase deviation information $A_T(t)$ into an absolute phase. The phase deviation information $A_T(t)$ which has been changed into an absolute phase is sent to the phase decision circuit 62 on a signal line 210. The phase decision circuit 62 also receives the symbol timing signal (clock signal) from the clock regenerator 58 on a signal line 214.

The phase decision circuit 62 estimates the transmission phase difference based on the phase deviation information $A_T(t)$, which has been sent from the phase decision circuit 62 and changed into an absolute phase, and on the symbol timing signal 214, and demodulates the signal to the data that was sent (in this example, 2-bit data). The data demodulated by this circuit is output on a signal line 212.

The phase deviation information $A_T(t)=A(t-T)-A(t)$ generated by the differential circuit 54 described above is sent also to the clock regenerator 58 on the signal line 208. The clock regenerator 58 extracts the phase extraction timing signal, that is, the symbol timing signal, from the received phase deviation information $A_T(t)$, and also regenerates the clock signal, which synchronizes with this symbol timing signal, from the extracted symbol timing signal. The regenerated clock signal is sent to signal lines 214 and 216.

In this example, the differential circuit 54 subtracts the phase signal A(t) of the immediately-preceding symbol of a one-symbol-delayed phase signal from the one-symbol-delayed phase signal A(t−T). The differential circuit may also subtract the one-symbol-delayed phase signal A(t−T) of a symbol from the phase signal A(t) of the symbol.

The basic operation of the configuration shown in FIG. 5 was described above. The operation of the configuration shown in FIG. 5 will be described more in detail with a preamble pattern, from which the symbol timing signal is easily extracted, as an example.

Figure 6:
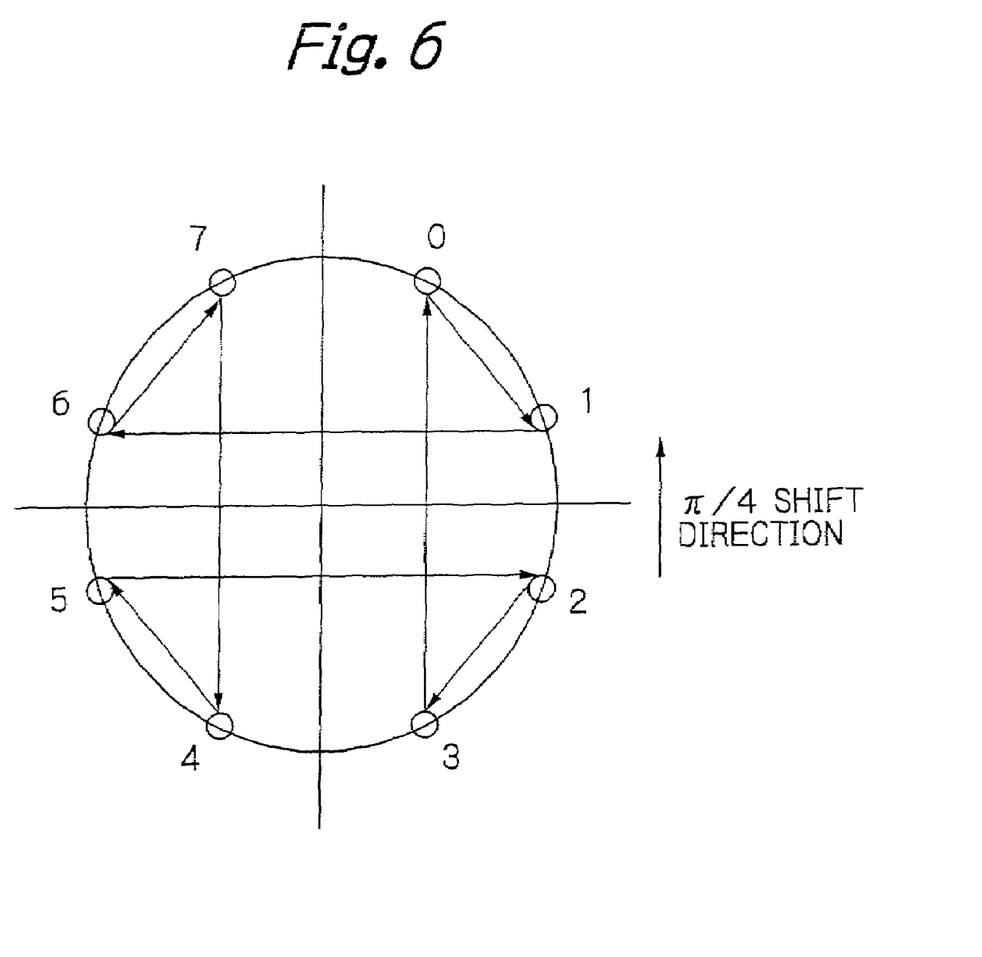
FIG. 6 is a diagram useful for understanding the operation of a demodulator shown in FIGS. 1, 3, 4, and 5 in which the phase deviation of a preamble pattern is shown.

In such a transmission system, the sending side appends an easily extractable preamble pattern near the start of a sending frame for quick timing signal extraction. In this example, this easily extractable preamble pattern "011001100110 . . . " is used. FIG. 6 shows the phase transition of the preamble pattern described above. The phase transition information in FIG. 6 corresponds to the output information from the phase detector 50.

Figure 7:
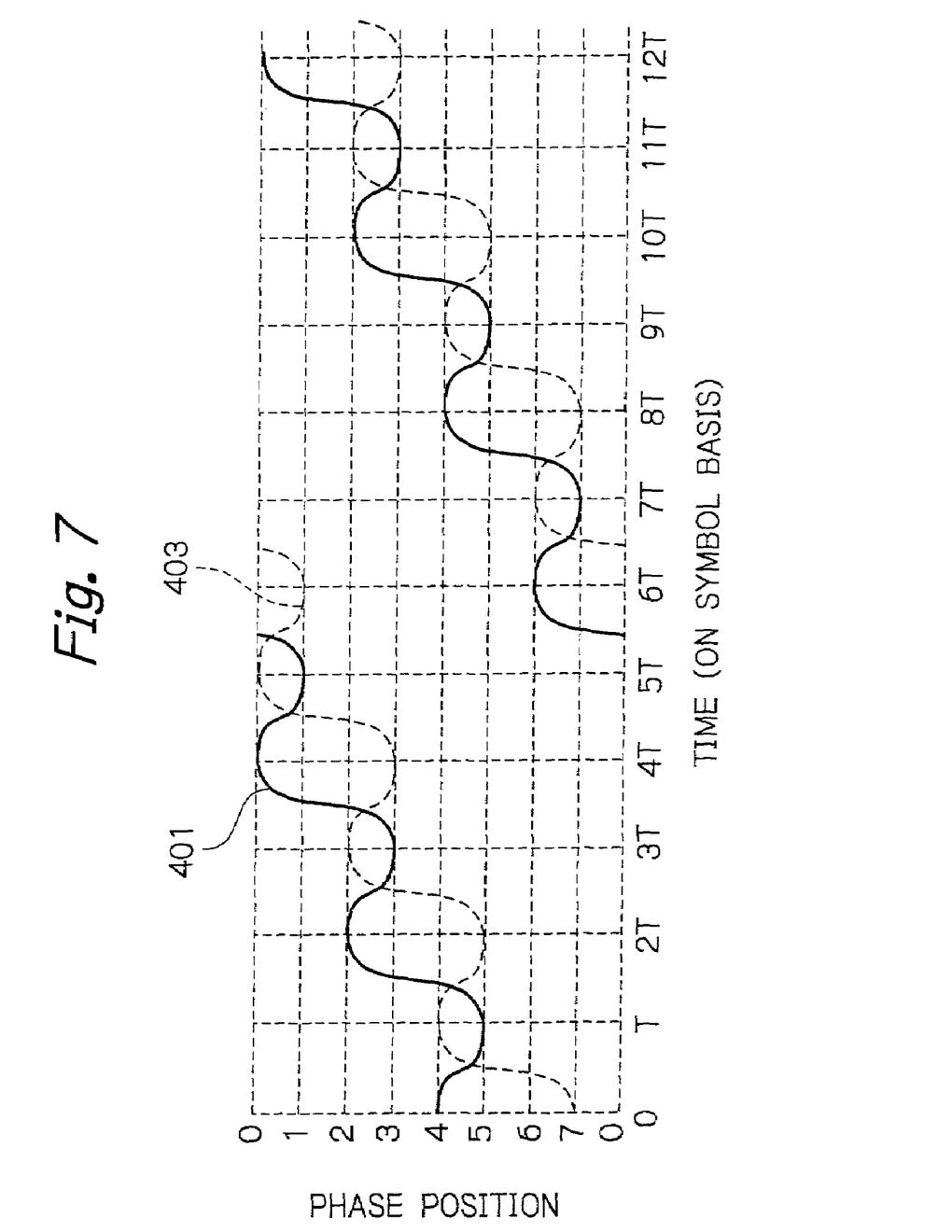
FIG. 7 is a diagram, similar to FIG. 2, useful for understanding the operation of the demodulator shown in FIGS. 1, 3, 4, and 5 in which the phase transitions of the current preamble pattern and the one-symbol-delayed preamble pattern are plotted.

FIG. 7 shows phase transition information on two preamble patterns with the horizontal axis as the time axis. One is phase transition information on the preamble pattern before the one-symbol-delay as plotted with a solid line 401, and the other is phase transition information on the preamble pattern generated by delaying the preamble pattern before the one-symbol-delay for the one-symbol period as plotted with a dotted line 403. The former information 401 corresponds to the output information of the phase detector 50, while the latter information 403 to the output information of the one-symbol delay 52.

Figure 8:
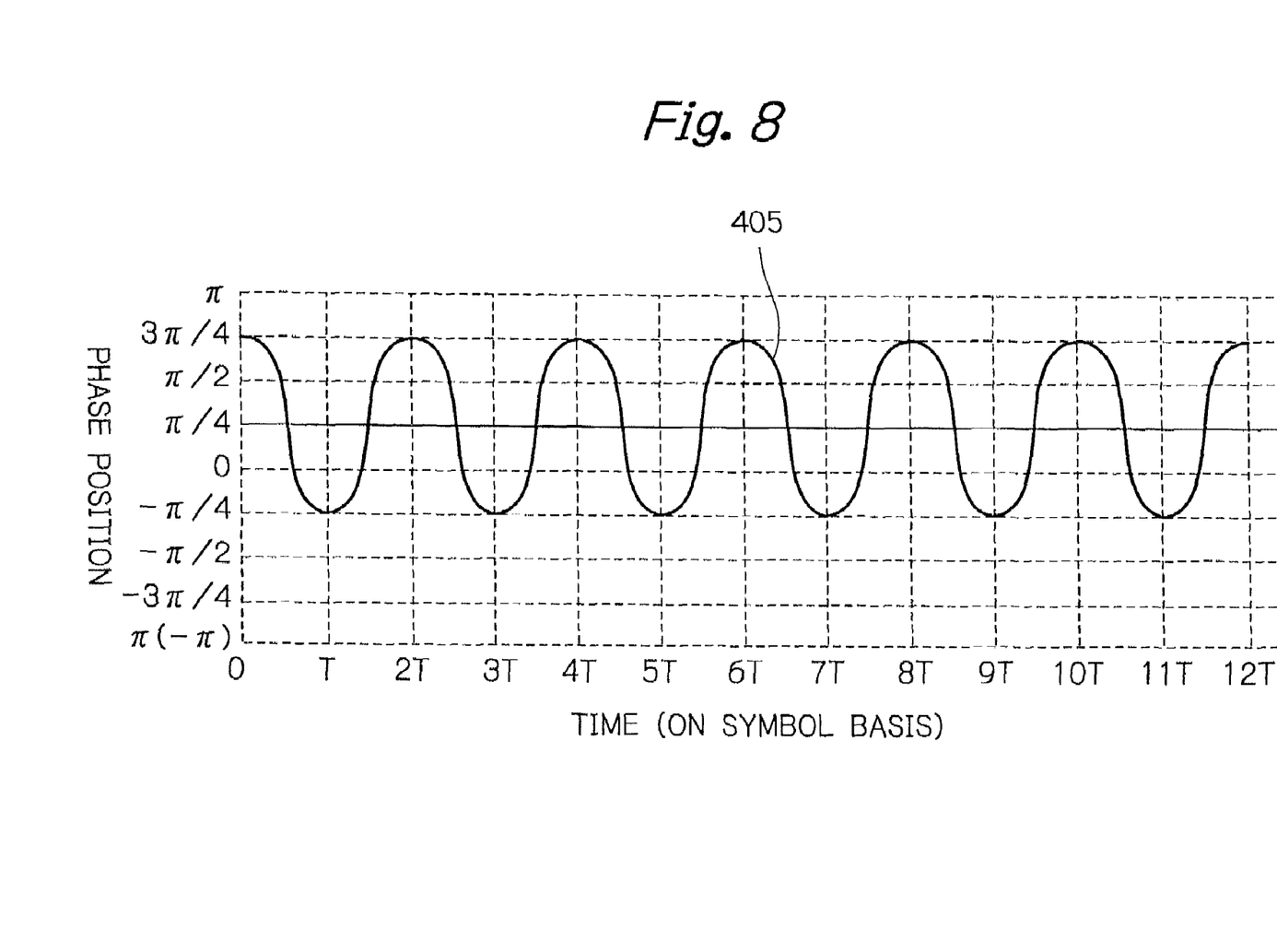
FIG. 8 is a diagram, similar to FIG. 2, useful for understanding the operation of the demodulator shown in FIGS. 1, 3, 4, and 5 in which the phase transition based on the difference between preamble patterns before and after one-symbol-delay is plotted.

FIG. 8 shows the phase transition (differential detection) of the preamble pattern 405 that is the difference in phase between the transition of the one-symbol-delayed preamble pattern and the transition of the preamble pattern before the one-symbol delay. The phase transition 405 corresponds to the output information from the differential circuit 54.

As understood from FIG. 8, the out put information of the differential circuit 54 obtained from the preamble pattern is a cyclic or periodic wave with the amplitude of π. The differential circuit 54 sends this cyclic wave with the amplitude of π to the clock regenerator 58. The clock regenerator 58 counts the number of periods T/2 in respect of crossing the center of the amplitude (π/4) of the cyclic wave sent from the clock regenerator 58 to generate the phase extraction timing signal, that is, the symbol timing signal. The circuit also generates the clock signal synchronizing with the extracted symbol timing signal.

Actually, however, a carrier frequency phase error is involved between the carrier (transmission frequency) of the sending digital radio apparatus and the carrier of a receiving digital radio apparatus. Therefore, the receiver side finds out a phase error in the carrier frequency. Suppose that the phase error in the carrier frequency is α+θ×t (where α and θ are constants). Let $A_T(t)_1$ be the phase deviation information including this phase error. Then, the phase deviation information $A_T(t)_1$ output from the differential circuit 54 is represented by expression (1) as follows:

$$A_T(t)_1=(A(t-T)+\alpha+\theta(t-T))-(A(t)+\alpha+(\theta \times t))=A(t-T)-A(t)+\theta_1. \quad (1)$$

Because $\theta_1=-\theta \times T$ where T is a one-symbol time, $\theta_1=-\theta$ is a phase deviation error caused by the carrier frequency error between the sending digital radio apparatus and the receiving digital radio apparatus. Note that $\theta_1$ may be represented in radians.

Figure 9:
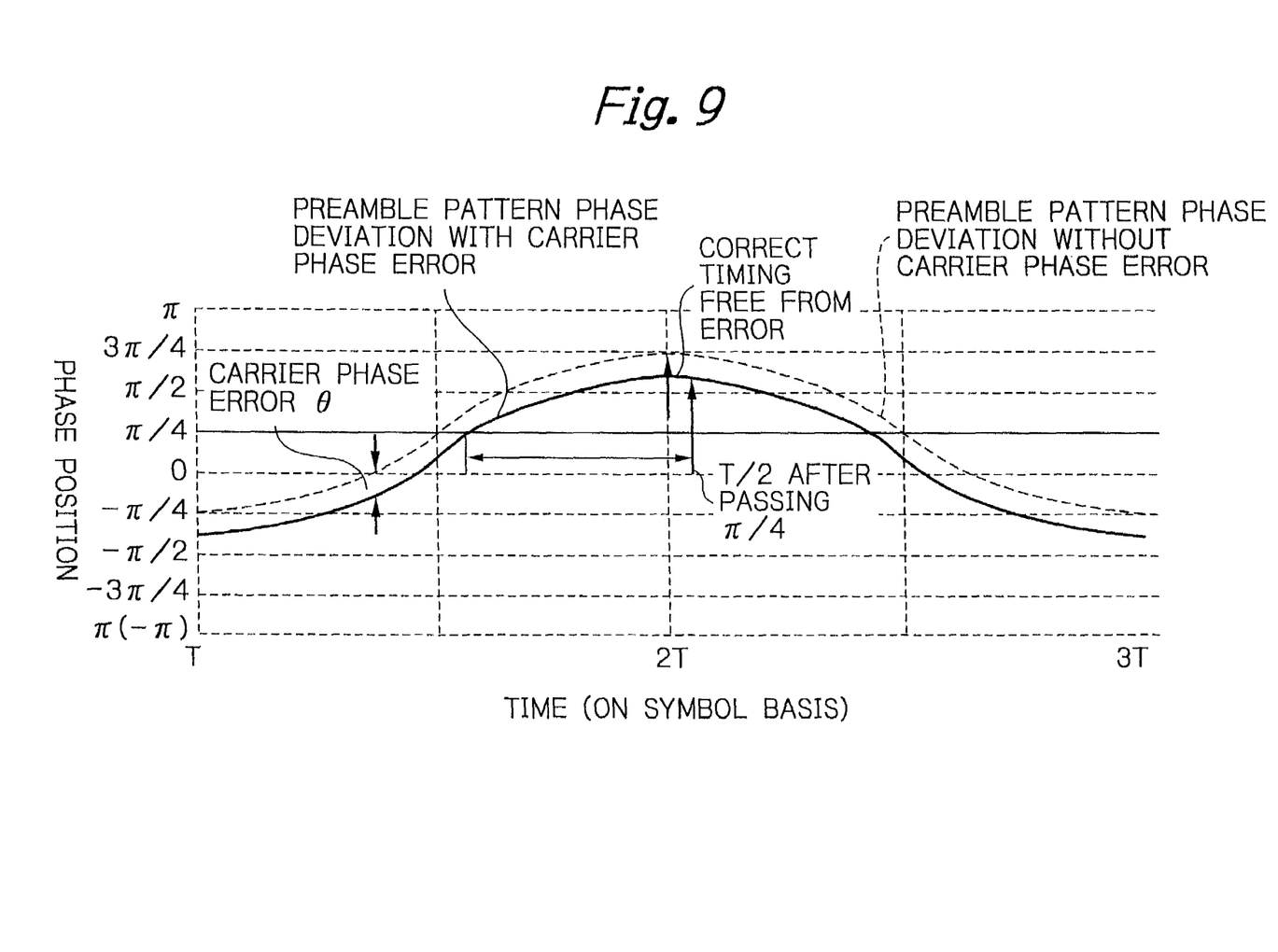
FIG. 9 is a diagram, similar to FIG. 2, useful for understanding the operation of the conventional demodulator shown in FIG. 5 in which a symbol timing error caused by a carrier phase error in the phase deviation of a preamble pattern is plotted.

The phase deviation information including the phase deviation error $\theta_1$ is sent to the clock regenerator 58. Therefore, the symbol timing signal generated by the clock regenerator 58 includes the symbol timing error such as the one shown in FIG. 9.

As described above, phase deviation information generated by the conventional digital demodulator shown in FIG. 5 includes a phase deviation error $\theta_1$. This error prevents the demodulator from regenerating symbol clocks correctly and from regenerating demodulated data correctly.

SUMMARY OF THE INVENTION

It is therefore an object of the present invention to provide a demodulator which solves the drawbacks found in the prior art and which is capable of correcting an error in received phase information and regenerating clocks regardless of how much frequency error (a fixed amount of phase error) is generated by the carrier between the sending digital radio apparatus and the receiving digital radio apparatus.

To solve the above problems, the present invention provides a demodulator which comprises a phase detector detecting a phase of a received signal and outputting a detection result; a first differential circuit calculating a difference between the detection result and first delay information generated by delaying the detection result for a predetermined period of time and outputting first phase difference information; a second differential circuit calculating a difference between the first delay information and second delay information generated by delaying the first delay information for the predetermined period of time and outputting second phase difference information; a third differential circuit calculating a difference between the first phase difference information and the second phase difference information and out putting third phase difference information; a phase error detector calculating and outputting a phase error based on the third phase difference information; and a phase corrector correcting the phase based on the first phase difference information and the phase error.

To solve the above problems, the present invention also provides, in a digital transmission system comprising a sending digital apparatus sending a frame signal, which includes a preamble pattern composed of a predetermined number of bits each having a predetermined logical value and which is modulated by a digital modulation scheme, and a receiving digital apparatus receiving the modulated signal received from the sending digital apparatus, a demodulator for use in the receiving digital apparatus. The demodulator comprises a phase detector receiving a quadrature detection signal which is a base-band signal after a quadrature detection of a modulated signal received from the sending digital apparatus and converting the received quadrature detection signal to first phase information; a first differential circuit calculating, for each symbol, a difference between the first phase information converted by the phase detector and one-symbol-delayed phase information of the first phase information and outputting the difference as first phase difference information; a second differential circuit calculating, for each symbol, a difference between the one-symbol-delayed phase information of the first phase information converted by the phase detector and two-symbol-delayed phase information of the first phase information converted by the phase detector and outputting the difference as second phase difference information; a third differential circuit calculating, for each symbol, a difference between the first phase difference information output by the first differential circuit and the second phase difference information output by the second differential circuit and outputting the difference as phase-difference difference information; and a phase error detector generating phase error information generated by a carrier frequency difference between the sending digital radio apparatus and the receiving digital radio apparatus, based either on the phase-difference difference information from the third difference circuit and the first phase difference information or on the phase-difference difference information and the second phase difference information.

To solve the above problems, the present invention also provides the above-described demodulator used in the receiving digital apparatus which further comprises a phase corrector subtracting the phase error information output from the phase error detector from the first phase difference information output from the first difference circuit and outputting third phase difference information obtained from the subtraction.

To solve the above problems, the present invention also provides the above-described demodulator used in the receiving digital apparatus and having the phase corrector, which further comprises a clock regenerator extracting a symbol timing signal from the third phase difference information based on the preamble pattern of the third phase difference information output from the phase corrector to generate a clock signal synchronizing with the extracted symbol timing signal.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
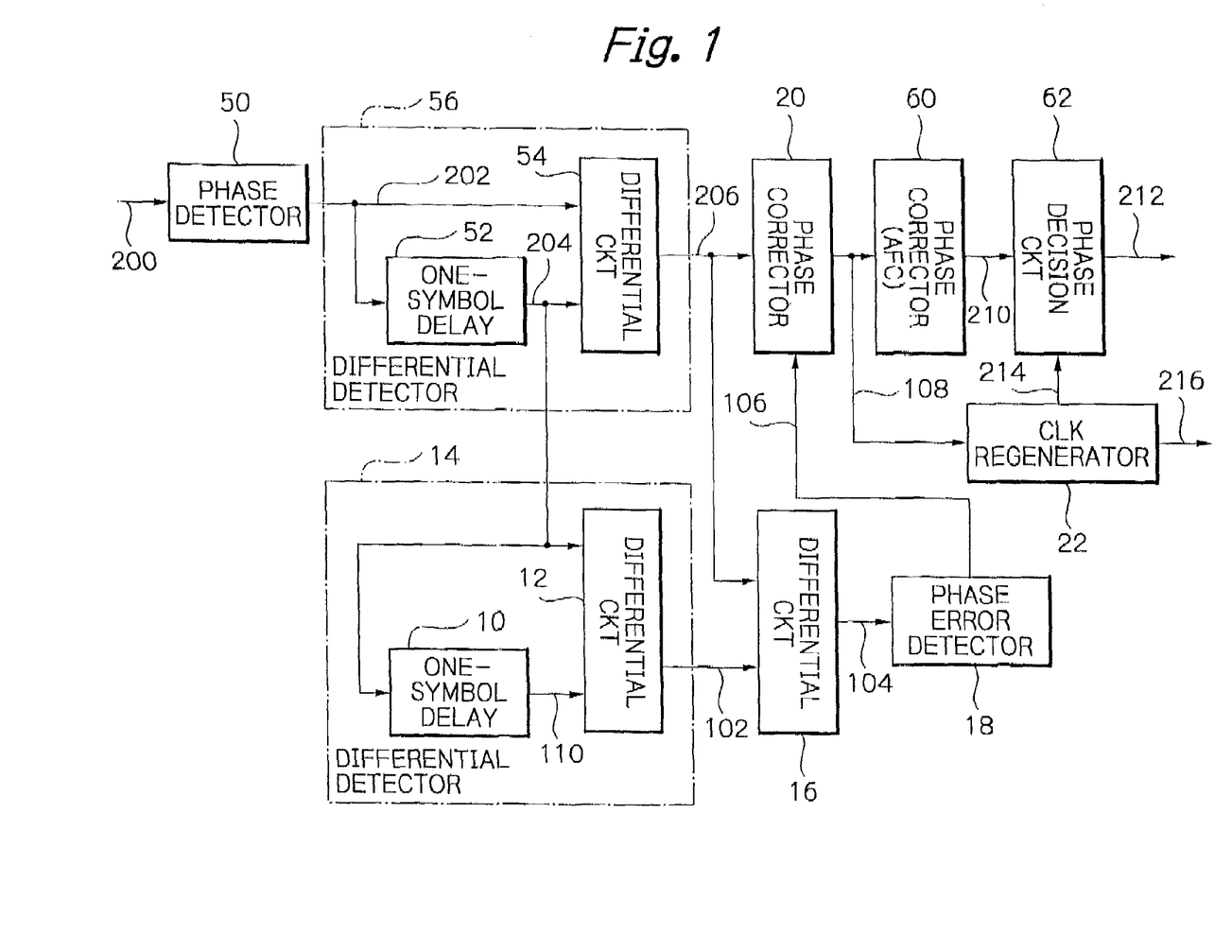
FIG. 1 is a functional block diagram schematically showing a demodulator in an embodiment according to the present invention that is applied to a receiving digital radio apparatus.

Referring to the accompanying drawings, some preferred embodiments of a demodulator according to the present invention applicable to a receiving digital radio apparatus will be described in detail. FIG. 1 is a functional block diagram of an embodiment of a demodulator according to the present invention that is applicable to a receiving digital radio apparatus. Referring to FIG. 1, the demodulator comprises a differential detector 14 composed of a one-symbol delay 10 and a differential circuit 12, another differential circuit 16, a phase error detector 18, a phase corrector 20, a clock regenerator or recovery 22, a phase detector 50, a differential detector 56 composed of a one-symbol delay 52 and a differential circuit 54, a phase corrector (AFC) 60, and another phase decision circuit 62.

As shown in FIG. 1, the differential detector 14, differential circuit 16, phase error detector 18, phase corrector 20, clock regenerator 22, phase detector 50, and differential detector 56 are used for clock regeneration or recovery according to the present invention. In addition, the differential detector 14, differential circuit 16, phase error detector 18, phase corrector 20, phase detector 50, differential detector 56, phase corrector (AFC) 60, and phase decision circuit 62 are used for signal regeneration or restoration.

More specifically, the demodulator shown in FIG. 1 uses phase-difference difference information 104 generated by determining the difference between phase difference information (differential detection information) 206 which is generated by determining the difference of the phase signal of the current symbol against the phase signal of the immediately-preceding symbol of the current symbol and phase difference information (differential detection information) 102 which is generated by determining the difference of the phase signal of the next-immediately-preceding symbol of the current symbol against the phase signal of the immediately-preceding symbol of the current symbol, the phase difference information (differential detection information) 206, and the phase difference information (differential detection information) 102 to calculate a carrier phase error value.

Then, the modulator uses the resultant carrier phase error value to correct a carrier phase error included in the phase difference information (differential detection information) 206, uses phase difference information (differential detection information) 108 whose carrier phase error has been corrected to regenerate the clock signal, and also regenerates the received signal (phase information) based on the regenerated clock signal and phase difference information (differential detection information) 210 generated by changing the phase of the phase-carrier-error corrected phase difference information (differential detection information) 108 into an absolute phase.

In FIG. 1, the same reference numerals as those in FIG. 5 represent the basically same functional elements and, therefore, their description is omitted. The demodulator shown in FIG. 1 is different in structure from the demodulator shown in FIG. 5 specifically in that the differential detector 14 composed of the one-symbol delay 10 and the differential circuit 12, differential circuit 16, phase error detector 18, and phase corrector 20 are added. In addition, in the demodulator in FIG. 1, the clock regenerator 22 is replaced for the clock regenerator 58 in FIG. 5.

Because these functional units are added and/or replaced, the connection of the signal lines of the demodulator shown in FIG. 1 differs from the connection of the signal lines of the demodulator shown in FIG. 5 as described below. The signal line 206 is connected also to one input of the differential circuit 16 and to the corresponding input of the phase corrector 20, the signal line 204 is connected to the input of the one-symbol delay 10 and to one input of the differential circuit 12, the output of the one-symbol delay 10 is connected to the other input of the differential circuit 12 by a signal line 110, the output of the differential circuit 12 is connected to the other input of the differential circuit 16 by a signal line 102, the output of the differential circuit 16 is connected to the input of the phase error detector 18 by a signal line 104, the output of the phase error detector 18 is connected to the corresponding input of the phase corrector 20 by a signal line 106, and the output of the phase corrector 20 is connected to the input of the phase corrector (AFC) 60 and to the input of the clock regenerator 22 by a signal line 108.

First, the added differential detector 14, differential circuit 16, phase error detector 18, and phase corrector 20, and the changed clock regenerator 22 will be described. The differential detector 14 comprises the one-symbol delay 10 and the differential circuit 12 as described above. The phase signal A (t–T) output from the one-symbol delay 52 is input to the input of the one-symbol delay 10 and to one input of the differential circuit 12.

The one-symbol delay 10 is adapted to delay the received one-symbol-delayed phase signal A(t–T) for another one symbol period and output the delayed phase signal A(t–2T). This phase signal A(t–2T) is sent to the other input of the differential circuit 12 on the signal line 110.

The differential circuit 12 is adapted to generate the difference between the received phase signal A(t–2T) and the received phase signal A(t–T). More specifically, the phase difference information, that is, the phase deviation information $A_{2T}$ (t)=A(t–2T)–A(t–T), is output from the output 102 of the differential circuit 12. The phase deviation information $A_{2T}$ (t) obtained from the differential circuit 12 is sent to one input of the differential circuit 16 over the signal line 102.

The phase deviation information $A_T$ (t)=A(t–T)–A(t) obtained from the differential circuit 54 is sent to the other input of the differential circuit 16 via the signal line 206. The differential circuit 16 generates the difference between the received phase deviation information $A_{2T}$ (t) and the received phase deviation information $A_T$ (t). Specifically, phase-difference difference information, that is, phase deviation difference information B(t)=$A_{2T}$ (t)–$A_T$ (t) is output from the output 104 of the differential circuit 16. The phase deviation difference information $$B(t) = A_{2T}(t) - A_T(t) = A(t-2T) - 2A(t-T) + A(t)$$

obtained from the differential circuit 16 is sent to the phase error detector 18 on the signal line 104.

In this example, the differential circuit 12 subtracts the phase signal A(t–T) of the immediately-preceding symbol of a two-symbol-delayed phase signal from the two-symbol-delayed phase signal A(t–2T). The differential circuit may also subtract the one-symbol-delayed phase signal A(t–2T) of an immediately-preceding symbol from the phase signal A(t–T) of the immediately-preceding symbol. The same applies also to the differential circuit 16.

It is assumed in the above description that there is no error between the carrier of the sending digital radio apparatus and the carrier of the receiving digital radio apparatus when a preamble pattern in the bit configuration described above is applied. Actually, however, there is an error between the carrier of the sending digital radio apparatus and the carrier of the receiving digital radio apparatus as described above. Therefore, the receiving side finds out a carrier frequency phase error, that is, a carrier phase error of α+θ×t (where α and θ are constants). The variation in the carrier phase error value generated by this carrier frequency error is so small that it may be ignored.

Next, the operation of the major functional units that is performed when a carrier frequency phase error occurs will be described. When such a phase error is included, the phase deviation information $A_T$ (t)$_1$ output from the differential circuit 54 is defined by expression (1) above. The phase deviation information $A_{2T}$ (t)$_1$ output from the differential circuit 12 is defined by expression (2) below.

$$A_{2T}(t)_1 = (A(t-2T) + \alpha + \theta \times (t-2T)) - \quad (2)$$
$$(A(t-T) + \alpha + \theta \times (t-T))$$
$$= A(t-2T) - A(t-T) + \theta \times (t-2T) -$$
$$\theta \times (t-T).$$

The phase deviation difference information B(t)$_1$ output from the differential circuit 16 is defined by expression (3) below.

$$B(t)_1 = A_{2T}(t)_1 - A_T(t)_1 \quad (3)$$
$$= (A(t-2T) - A(t-T) + \theta \times (t-2T) - \theta \times (t-T)) -$$
$$(A(t-T) - A(t) + \theta \times (t-T) - (\theta \times t))$$
$$= A(t-2T) - 2A(t-T) + A(t) +$$
$$(\theta \times (t-2T) - \theta \times (t-T)) -$$
$$(\theta \times (t-T) - (\theta \times t))$$
$$= A(t-2T) - 2A(t-T) + A(t) + \theta_2.$$

As described above, the variation in the carrier phase error value caused by a carrier frequency error is so small that it may be ignored. Therefore, phase deviation error $$\theta_2 = (\theta \times (t-2T) - \theta \times (t-T)) - (\theta \times (t-T) - (\theta \times t)).$$

The phase deviation error θ×(t–2T)–θ×(t–T) and the phase deviation error θ×(t–T)–(θ×t) may be regarded as the same value as each other. Therefore, it may be said that $\theta_2$=0. Thus, the phase deviation difference information B(t)$_1$ output from the differential circuit 16 is the value from which a carrier frequency error has been removed.

The differential circuit 16 sends the phase deviation difference information, not including the error $\theta_2$ in the phase deviation difference, to the phase error detector 18. The differential circuit 16 also sends the received phase deviation information $A_T$ (t)$_1$ and phase deviation information $A_{2T}$ (t)$_1$ to the phase error detector 18.

When the preamble pattern is an ideal pattern which includes neither a carrier frequency phase errors nor a noise component and when the phase deviation difference information B(t)$_1$ described above is null, the phase deviation information $A_T$ (t)$_1$ and the phase deviation information $A_{2T}$ (t)$_1$, from which the phase deviation difference information B(t)$_1$ is generated, are each π/4.

Therefore, when the preamble pattern includes only a carrier frequency phase error but not a noise component and when the phase deviation difference information B(t)$_1$ is 0, subtracting π/4 from the value of the phase deviation information $A_T$ (t)$_1$ and from the value of the phase deviation information $A_{2T}$ (t)$_1$ (at this time, phase deviation information $A_T$ (t)$_1$ and the phase deviation information $A_{2T}$ (t)$_1$ have the same value) gives a carrier frequency phase error.

Figure 2:
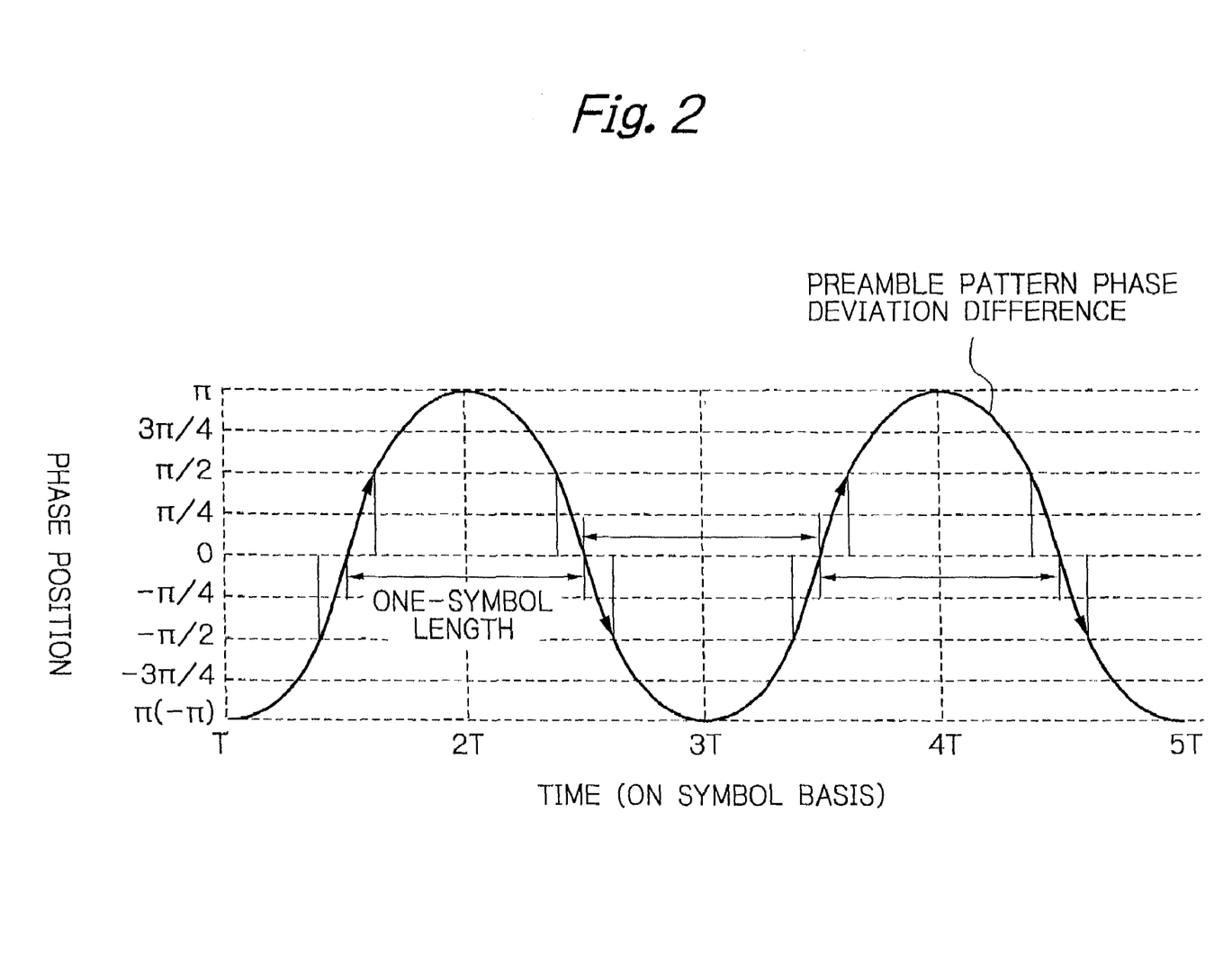
FIG. 2 is a diagram useful for understanding the operation of the demodulator according to the present invention shown in FIG. 1 in which error detection timing signals are extracted from phase deviation signals of a preamble pattern.

The locus of a phase deviation difference generated when a preamble pattern arrives is shown in FIG. 2. When π/4 shift QPSK is used, the bit value combinations which repeatedly generate the locus shown in FIG. 2 are the combinations (1) to (4) shown below.

(1) "100110011001 . . . "
(2) "011001100110 . . . "
(3) "001100110011 . . . "
(4) "110011001100 . . . "

The above combinations (1) and (2) are preamble patterns. The preamble pattern (1) is shifted one symbol (2 bits in this example) with respect to the preamble pattern (2).

The above combinations (3) and (4) are the same signal pattern composed of a sequence of "0011". The signal pattern (3) is shifted one symbol with respect to the signal pattern (4). In this case, if it is possible to distinguish between a signal pattern and a preamble pattern which are each a pattern composed of "0011", the carrier phase error value is determined as the phase deviation value that corresponds to the value "0" of the phase deviation difference information $B(t)_1$. Once the carrier phase error value is determined, the error may be corrected.

The following describes the difference between a signal pattern and a preamble pattern. It is assume that non-preamble pattern transmission signals are encoded in advance as convolutional code. For example, suppose that the code rate R=½, that the constraint length K=6, and that the generator polynomials G1 (D)=1+D+D³+D⁵ and G1 (D)=1+D²+D³+D⁴+D⁵. In this case, because of the characteristics of a generator polynomial, the 12 bits of a convolutional transmission signal does not take any of the combinations (a)–(d) below.

(a) "100110011001"
(b) "011001100110"
(c) "001100110011"
(d) "110011001100"

Therefore, if a non-preamble pattern transmission signal is encoded as a convolutional code in advance, it is possible to distinguish between a non-preamble pattern transmission signal and a preamble pattern. Even if a non-preamble pattern transmission signal is not encoded as convolutional code in advance, preventing a non-preamble pattern transmission signal from taking any of the combinations described above makes it possible to distinguish between a non-preamble pattern transmission signal and a preamble pattern.

The locus shown in FIG. 2 which corresponds to the preamble pattern "100110011001" (corresponding to six symbols) is four symbols long and, during the period of that symbol length, the phase deviation difference value of 0 is passed four times.

FIG. 2 also shows that the monitoring of the phase deviation difference value described below allows the preamble pattern to be determined. The monitor value of the phase deviation difference value should change in the order of π/2, 0, −π/2, −π/2, 0, π/2, π/2, 0, −π/2, −π/2, 0 and π/2, and the monitor timing of the phase deviation difference value should be one-symbol time that is the time from 0 to 0. Note that the monitor values of the phase deviation difference value, π/2 and −π/2, may be reversed.

Actually, there are additional factors such as noise components. Therefore, with the monitor timing length of the phase deviation difference value as about one symbol time, the average of the four values of the phase deviation information $A_T(t)_1$ or the phase deviation information $A_{2T}(t)_1$ (for example, the values shown in FIG. 2) is calculated. This average is used as the phase deviation value.

Subtracting π/4 from the averaged phase deviation value gives a carrier frequency phase error with such factors as noise components taken into consideration.

The phase error detector 18 described below has a circuit which calculates a carrier frequency phase error. As described above, the phase error detector 18 receives the phase deviation difference information $B(t)_1$, phase deviation information $A_T(t)_1$, and phase deviation information $A_{2T}(t)_1$ from the differential circuit 16.

First, the phase error detector 18 determines that the signal of the phase deviation difference information $B(t)_1$ is a preamble pattern. Then, the phase error detector 18 detects the value of 0 of the phase deviation difference information $B(t)_1$ which is the central value of the amplitude of the cyclic wave (such as the one shown in FIG. 2) of the preamble pattern.

Next, the phase error detector 18 detects the value of the phase deviation information $A_T(t)_1$ and the value of the phase deviation information $A_{2T}(t)_1$ corresponding to the value of 0 that was detected. In addition, the phase error detector 18 subtracts π/4 from the value of the phase deviation information $A_T(t)_1$ and the value of phase deviation information $A_{2T}(t)_1$ and outputs one of two difference values, $\Delta\theta$, to the output 106. The output 106 of the phase error detector 18 is connected to the input 106 of the phase corrector 20.

In this embodiment, the phase error detector 18 receives the phase deviation difference information $B(t)_1$, phase deviation information $A_T(t)_1$, and phase deviation information $A_{2T}(t)_1$ from the differential circuit 16, detects the value of 0 of the phase deviation difference information $B(t)_1$, detects the value of the phase deviation information $A_T(t)_1$ and the value of phase deviation information $A_{2T}(t)_1$ corresponding to the value of 0 that was detected, subtracts π/4 from the detected values, and outputs one of the two differences, $\Delta\theta$, to the phase corrector 20. The phase error detector 18 may also receive the phase deviation difference information $B(t)_1$, phase deviation information $A_T(t)_1$, or phase deviation information $A_{2T}(t)_1$ from the differential circuit 16, detect the value of the phase deviation information $A_T(t)_1$ or the phase deviation information $A_{2T}(t)_1$ corresponding to the detected value of 0 described above, subtract π/4 from the detected value, and output the differences $\Delta\theta_1$ to the phase corrector 20.

The value of the phase deviation information $A_T(t)1$ or the phase deviation information $A_{2T}(t)_1$ described above is not averaged. The phase error detector 18 may include a circuit that finds the average as follows. When the detection value of 0 is detected in the periodic wave of the preamble pattern, for example, four times, the circuit detects the value of the phase deviation information $A_T(t)_1$ or the value of the phase deviation information $A_{2T}(t)_1$ each time the value of 0 is detected, adds up the detected four values of the phase deviation information $A_T(t)_1$ or the phase deviation information $A_{2T}(t)_1$, divides the sum by 4 to find the average of the phase deviation information, subtracts π/4 from the average, and outputs the difference $\Delta\theta_2$ to the phase corrector 20. Finding the average in this manner is efficient when the input signal includes noises.

In this example, the timing signal required by the phase error detector 18 to perform processing is sent from the clock regenerator 22, which will be described later.

The phase corrector 20 receives the phase deviation information $A_T(t)_1$ from the differential circuit 54 and, at the same time, receives the phase difference information $\Delta\theta_1$ or $\Delta\theta_2$ from the phase error detector 18 and subtracts $\Delta\theta_1$ or $\Delta\theta_2$ from the received phase deviation information $A_T(t)$ 1 to remove a carrier frequency phase error included therein. Phase deviation information $A_T(t)$ from which the carrier frequency phase error has been removed through subtraction is sent to the phase corrector (AFC) 60 and the clock regenerator 22 via the signal line 108.

The clock regenerator 22 extracts the symbol timing signal from the received phase deviation information $A_T(t)$ and regenerates or restores the clock signal, synchronizing with the symbol timing signal, from the extracted symbol timing signal. The regenerated clock signal is sent over the signal line 214 and the signal line 216.

More specifically, the preamble pattern information output from the phase corrector 20 is a cyclic wave, or like a sinusoidal wave, with the amplitude of π, as shown in FIG.

8, from which carrier frequency phase errors have been removed. The clock regenerator 22 counts the number of periods T/2 based on the center ($\pi/4$) of the amplitude of the cyclic wave sent from the clock regenerator 22 to obtain the phase extraction timing signal, that is, the symbol timing signal, and obtains the clock signal, which synchronizes with the symbol timing signal, from the extracted symbol timing signal. From the generated clock signal, the clock regenerator 22 also generates various timing signals required for the functional units and sends those signals to those functional units.

The phase corrector 20 also sends the phase deviation information $A_T$ (t), from which carrier frequency phase errors have been removed, to the phase decision circuit 62 via the phase corrector (AFC) 60. The phase decision circuit 62 receives the phase deviation information $A_T$ (t), from which carrier frequency phase errors have been removed, from the phase corrector 20 and at the same time receives the clock signal not including carrier frequency phase errors from the clock regenerator 22.

Therefore, the phase decision circuit 62 estimates the transmission phase error based on the received phase deviation information $A_T$ (t), from which carrier frequency phase errors have been removed, and on the clock signal, which does not include carrier frequency phase errors, to demodulate the transmission data (2-bit data in this example). Thus, the circuit can regenerate correct demodulated data.

According to the clock regeneration system of the demodulator in the first embodiment, the phase corrector 20 subtracts the phase difference in formation $\Delta\theta_1$ or $\Delta\theta_2$, which is sent from the phase error detector 18 and which is the amount of frequency error between the sending digital radio apparatus and the receiving digital radio apparatus, from the phase deviation information $A_T$ (t)$_1$ which is sent from the differential circuit 54 and which includes carrier frequency phase errors. The phase deviation information $A_T$ (t) from which carrier frequency phase errors have been removed is sent to the clock regenerator 22. In response to the phase deviation information $A_T$ (t), from which carrier frequency phase errors have been removed, from the phase corrector 20, the clock regenerator 22 can regenerate correct clock signals.

In addition, according to the signal regeneration system of the demodulator in the first embodiment, the phase decision circuit 62 receives the phase deviation information $A_T$ (t) from which carrier frequency phase errors have been removed, from the phase corrector 20 and at the same time receives the clock signal, which does not include carrier frequency phase errors, from the clock regenerator 22. Therefore, the phase decision circuit 62 can regenerate correct demodulated data.

Figure 3:
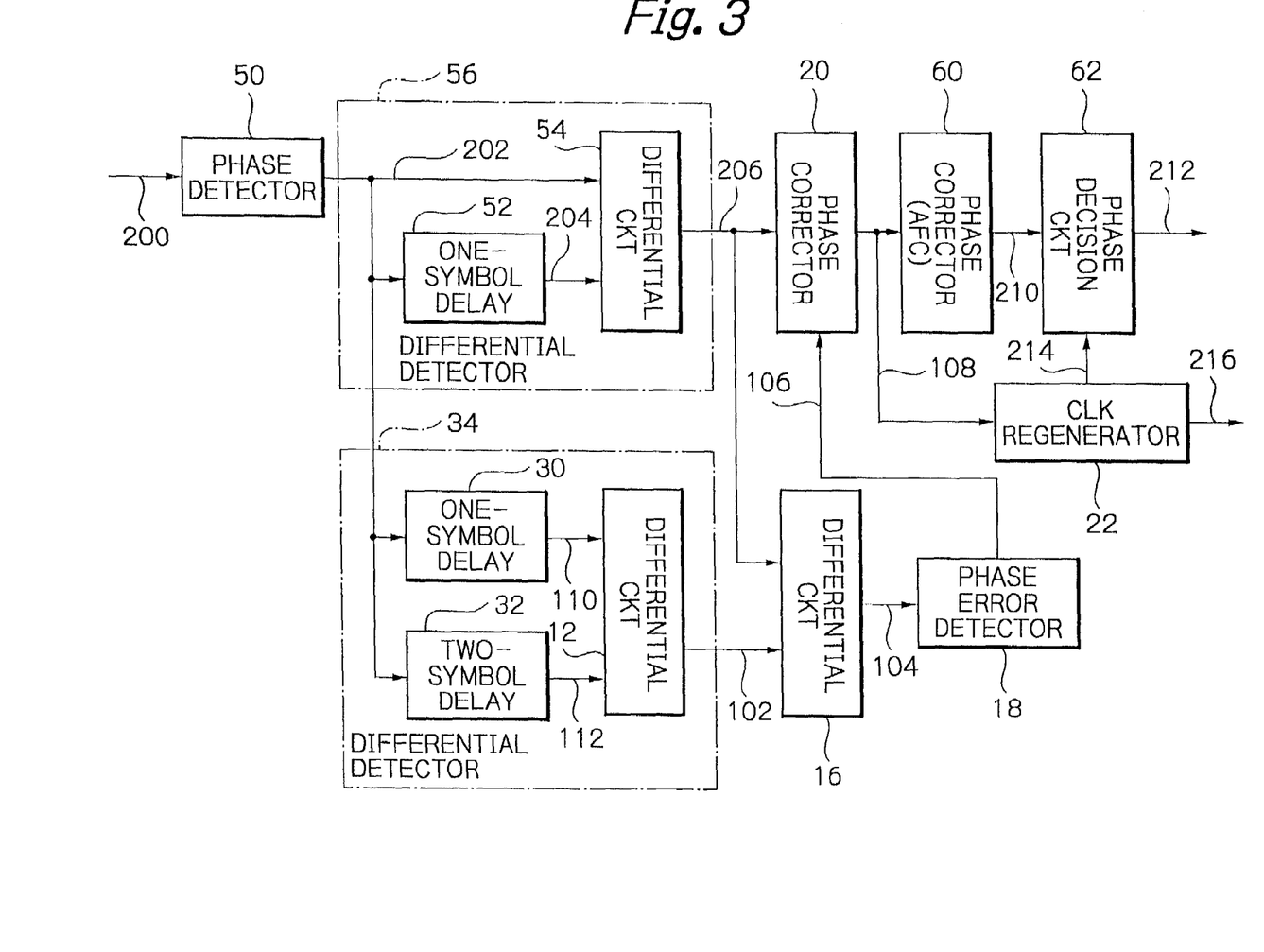
FIG. 3 is a functional block diagram, like FIG. 1, schematically showing a demodulator in an alternative embodiment according to the present invention that is applied to a receiving digital radio apparatus.

FIG. 3 is a functional block diagram showing an alternative embodiment of a demodulator according to the present invention applicable to a receiving digital radio apparatus. Referring to FIG. 3, the demodulator comprises a differential detector 34 comprising a one-symbol delay 30, a two-symbol delay 32, and the differential circuit 12, the differential circuit 16, the phase error detector 18, the phase corrector 20, the clock regenerator 22, the phase detector 50, the differential detector 56 comprising the one-symbol delay 52 and the differential circuit 54, the phase corrector (AFC) 60, and the phase decision circuit 62.

As understood from FIG. 3, the differential detector 34, differential circuit 16, phase error detector 18, phase corrector 20, clock regenerator 22, phase detector 50, and differential detector 56 are used in clock regeneration according to the present invention that is shown in FIG. 3. Also, the differential detector 34, differential circuit 16, phase error detector 18, phase corrector 20, phase detector 50, differential detector 56, phase corrector (AFC) 60, and phase decision circuit 62 are used in signal regeneration.

As shown in FIG. 3, the circuit configuration of the demodulator is basically the same as that of the demodulator shown in FIG. 1 and therefore the description of the demodulator shown in FIG. 3 is omitted.

Figure 4:
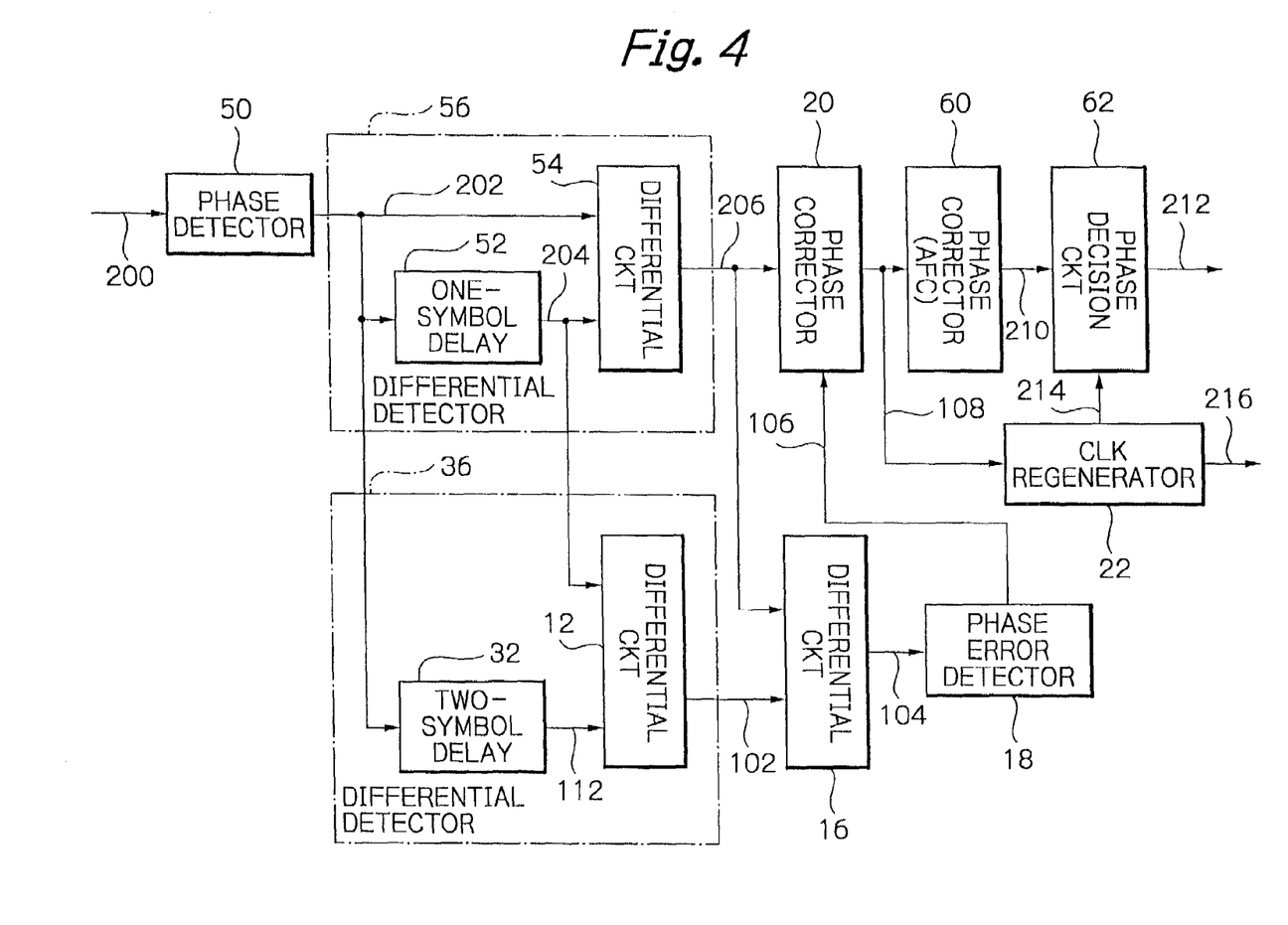
FIG. 4 is a functional block diagram, similar to FIG. 1, schematically showing a demodulator in a further alternative embodiment according to the present invention that is applied to a receiving digital radio apparatus.

FIG. 4 is a functional block diagram showing a further alternative embodiment of a demodulator according to the present invention applicable to a receiving digital radio apparatus. Referring to FIG. 4, the demodulator comprises a differential detector 36 comprising the two-symbol delay 32 and the differential circuit 12, the differential circuit 16, the phase error detector 18, the phase corrector 20, the clock regenerator 22, the phase detector 50, the differential detector 56 comprising a one-symbol delay 52 and the differential circuit 54, the phase corrector (AFC) 60, and the phase decision circuit 62.

As shown in FIG. 4, the differential detector 36, differential circuit 16, phase error detector 18, phase corrector 20, clock regenerator 22, phase detector 50, and differential detector 56 are used in clock regeneration according to the present invention that is shown in FIG. 4. Also, the differential detector 36, differential circuit 16, phase error detector 18, phase corrector 20, phase detector 50, differential detector 56, phase corrector (AFC) 60, and phase decision circuit 62 are used in signal regeneration.

As shown in FIG. 4, the circuit configuration of the demodulator in FIG. 4 is basically the same as that of the demodulator shown in FIG. 1 and therefore the description of the demodulator shown in FIG. 4 is omitted.

In those three embodiments, the preamble pattern with the bit configuration described above is used. A preamble pattern with the bit configuration, except the preamble pattern with the bit configuration whose phase transition is the one shown in FIG. 8, allows error-free symbol timing signals to be extracted.

Further in those three embodiments, the demodulator used in a receiving digital radio apparatus in a digital radio transmission system in which a sending digital radio apparatus and a receiving digital radio apparatus are connected via a radio connection is described. The present invention is applicable also to a demodulator in a receiving digital wired apparatus in a digital wire transmission system in which a sending digital wire apparatus and a receiving digital wire apparatus are connected by a wire.

The demodulator according to the illustrative embodiments comprises a phase detector detecting a phase of a received signal and outputting a detection result; a first differential circuit calculating a difference between the detection result and first delay in formation generated by delaying the detection result for a predetermined time and outputting first phase difference information; a second differential circuit calculating a difference between the first delay information and second delay information generated by delaying the first delay information for the predetermined time and outputting second phase difference information; a third differential circuit calculating a difference between the first phase difference information and the second phase difference information and outputting third phase difference information; a phase error detector calculating and outputting a phase error based on the third phase difference information; and a phase corrector correcting the phase based on the first phase difference information and the phase error.

The demodulator with this configuration obtains phase difference information whose phase information has been corrected by the phase corrector, thus enabling correct clock signals to be regenerated with error-free phase difference information and, in addition, regenerating correct signals (demodulated data).

In addition, the demodulator according to the embodiments comprises a phase detector receiving a quadrature detection signal which is a base-band signal after a quadrature detection of a modulated signal received from the sending digital apparatus and converting the received quadrature detection signal to phase information A; a first differential circuit calculating, for each symbol, a difference between the phase information A converted by the phase detector and one-symbol-delayed phase information of the phase information A and outputting the difference as first phase difference information; a second differential circuit calculating, for each symbol, a difference between the one-symbol-delayed phase information of the phase information A converted by the phase detector and two-symbol-delayed phase information of the phase information A converted by the phase detector and outputting the difference as second phase difference information; a third differential circuit calculating, for each symbol, a difference between the first phase difference information output by the first differential circuit and the second phase difference information output by the second differential circuit and outputting the difference as phase-difference difference information B; and a phase error detector generating phase error information based on a carrier frequency difference between the sending digital radio apparatus and the receiving digital radio apparatus, the carrier frequency difference being sent from the third differential circuit and being based either on the phase-difference difference information B and the first phase difference information or on the phase-difference difference information B and the second phase difference information.

The demodulator with this configuration uses the phase error detector to obtain phase error information based on the difference in the carrier frequency between the sending digital radio apparatus and the receiving digital radio apparatus. Therefore, subtracting this phase error information from the first phase difference information output from the first difference circuit to give phase difference information with no phase error. This error-free phase difference information allows clock signals and signals (demodulated data) to be regenerated correctly.

The entire disclosure of Japanese patent application No. 2000-288885 filed on Sep. 19, 2000 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A demodulator comprising:
a phase detector receiving a signal and detecting a phase of the received signal to output a detection result representative of the detected phase;
a first differential circuit delaying the detection result for a predetermined period of time to produce first delay information and calculating a difference between the detection result and the first delay information to output first phase difference information;
a second differential circuit delaying the first delay information for the predetermined period of time to produce second delay information and calculating a difference between the first delay information and the second delay information to output second phase difference information;
a third differential circuit calculating a difference between the first phase difference information and the second phase difference information to output third phase difference information;
a phase error detector calculating a phase error on a basis of the third phase difference information to output the phase error; and
a phase corrector correcting the phase of the received signal on a basis of the first phase difference information and the phase error.

2. The demodulator according to claim 1 wherein the received signal is a base-band signal to which a frame signal modulated by a π/4 shift QPSK (Quadrature Phase Shift Keying) is demodulated, the frame signal including a preamble pattern composed of a predetermined number of bits each having a predetermined logical value.

3. The demodulator according to claim 2, wherein said phase corrector subtracts the phase error from the first phase difference information to produce fourth phase difference information.

4. The demodulator according to claim 3, wherein said phase corrector comprises a clock regenerator extracting a symbol timing from the fourth phase difference information based on the preamble pattern to generate a clock signal synchronizing with the extracted symbol timing,
said demodulator further comprising a phase decision circuit determining the phase of the received signal on a basis of an absolute phase of the fourth phase difference information in response to the clock signal.

5. A demodulator comprising:
a phase detector receiving a signal and detecting a phase of the received signal to output a detection result representative of the detected phase;
a first differential circuit delaying the detection result for a first predetermined period of time to produce first delay information and calculating a difference between the detection result and the first delay information to output first phase difference information;
a second differential circuit delaying the detection result for the first predetermined period of time to produce second delay information and the detection result for a second predetermined period of time, which is substantially twice as long as the first predetermined period of time, to produce third delay information, and calculating a difference between the second delay information and the third delay information to output second phase difference information;
a third differential circuit calculating a difference between the first phase difference information and the second phase difference information to output third phase difference information;
a phase error detector calculating a phase error on a basis of the third phase difference information to output the phase error; and
a phase corrector correcting the phase of the received signal on a basis of the first phase difference information and the phase error.

6. The demodulator according to claim 5 wherein the received signal is a base-band signal to which a frame signal modulated by a π/4 shift QPSK (Quadrature Phase Shift Keying) is demodulated, the frame signal including a preamble pattern composed of a predetermined number of bits each having a predetermined logical value.

7. The demodulator according to claim 6, wherein said phase corrector subtracts the phase error from the first phase difference information to produce fourth phase difference information.

8. The demodulator according to claim 7, wherein said phase corrector comprises a clock regenerator extracting a symbol timing from the fourth phase difference information based on the preamble pattern to generate a clock signal synchronizing with the extracted symbol timing, said demodulator further comprising a phase decision circuit determining the phase of the received signal on a basis of an absolute phase of the fourth phase difference information in response to the clock signal.

9. A demodulator comprising:

a phase detector receiving a signal and detecting a phase of the received signal to output a detection result representative of the detected phase;

a first differential circuit delaying the detection result for a first predetermined period of time to produce first delay information and calculating a difference between the detection result and the first delay information to output first phase difference information;

a second differential circuit delaying the detection result for a second predetermined period of time, which is substantially twice as long as the first predetermined period of time, to produce second delay information and calculating a difference between the first delay information and the second delay information to output second phase difference information;

a third differential circuit calculating a difference between the first phase difference information and the second phase difference information to output third phase difference information;

a phase error detector calculating a phase error on a basis of the third phase difference information to output the phase error; and a phase corrector correcting the phase of the received signal on a basis of the first phase difference information and the phase error.

10. The demodulator according to claim 9 wherein the received signal is a base-band signal to which a frame signal modulated by a $\pi/4$ shift QPSK (Quadrature Phase Shift Keying) is demodulated, the frame signal including a preamble pattern composed of a predetermined number of bits each having a predetermined logical value.

11. The demodulator according to claim 10, wherein said phase corrector subtracts the phase error from the first phase difference information to produce fourth phase difference information.

12. The demodulator according to claim 11, wherein said phase corrector comprises a clock regenerator extracting a symbol timing from the fourth phase difference information based on the preamble pattern to generate a clock signal synchronizing with the extracted symbol timing, said demodulator further comprising a phase decision circuit determining the phase of the received signal on a basis of an absolute phase of the fourth phase difference information in response to the clock signal.

13. A demodulator for use in a receiver digital apparatus in a digital transmission system for receiving a frame signal transmitted from a sender digital apparatus, the frame signal including a preamble pattern composed of a predetermined number of bits each having a predetermined logical value and being modulated by a digital modulation scheme, the receiver digital apparatus quadrature-detecting the modulated signal transmitted from the sender digital apparatus into a quadrature detection signal in a form of base-band signal, said demodulator comprising:

a phase detector receiving the quadrature detection signal and converting the received quadrature detection signal to first phase information;

a first differential circuit calculating, for each symbol, a first difference between the first phase information and one-symbol-delayed phase information of the first phase information to output the first difference as first phase difference information;

a second differential circuit calculating, for each symbol, a second difference between the one-symbol-delayed phase information and two-symbol-delayed phase information of the first phase information to output the second difference as second phase difference information;

a third differential circuit calculating, for each symbol, a third difference between the first phase difference information and the second phase difference information to output the third difference as phase-difference difference information; and a phase error detector generating phase error information representative of a phase error caused by a carrier frequency difference between the sender digital apparatus and the receiver digital apparatus, on a basis of either the phase-difference difference information and the first phase difference information or the phase-difference difference information and the second phase difference information.

14. The demodulator according to claim 13, further comprising a phase corrector subtracting the phase error information from the first phase difference information to output third phase difference information.

15. The demodulator according to claim 14, further comprising a clock regenerator extracting a symbol timing from the third phase difference information on a basis of the preamble pattern of the third phase difference information to generate a clock signal synchronizing with the extracted symbol timing.

16. The demodulator according to claim 13 wherein said digital modulation scheme is $\pi/4$ shift QPSK (Quadrature Phase Shift Keying).

* * * * *